United States Patent [19]

Stevens

[11] Patent Number: 5,539,266
[45] Date of Patent: Jul. 23, 1996

[54] DUAL COAXIAL MAGNETIC COUPLERS FOR VACUUM CHAMBER ROBOT ASSEMBLY

[75] Inventor: Craig L. Stevens, Felton, Calif.

[73] Assignee: Applied Materials Inc., Santa Clara, Calif.

[21] Appl. No.: 544,281

[22] Filed: Oct. 17, 1995

Related U.S. Application Data

[63] Continuation of Ser. No. 338,426, Nov. 14, 1994, abandoned, which is a continuation of Ser. No. 10,377, Jan. 28, 1993, Pat. No. 5,376,862.

[51] Int. Cl.$^6$ ............................. H02K 49/10; H02K 7/10; B25J 11/00
[52] U.S. Cl. ............................. 310/75 D; 310/103; 901/23
[58] Field of Search ............................. 310/75 D, 86, 310/103, 104; 335/302, 303, 304, 305, 306; 464/29; 901/15, 20, 23, 24, 25, 28

[56] References Cited

U.S. PATENT DOCUMENTS

| | | | |
|---|---|---|---|
| 2,722,617 | 11/1955 | Cluwen et al. | 310/103 |
| 2,973,107 | 2/1961 | Cherel | 901/16 |
| 2,993,152 | 7/1961 | Pierce et al. | 335/306 |
| 3,523,204 | 8/1970 | Rand | 310/94 |
| 3,781,626 | 12/1973 | Kubo et al. | 318/561 |
| 3,799,057 | 3/1974 | Cassel | 214/16.4 A |
| 3,936,683 | 2/1976 | Walker | 310/103 |
| 3,954,191 | 5/1976 | Wittkower et al. | 414/217 |
| 4,163,164 | 7/1979 | Pieters | 310/103 |
| 4,163,914 | 8/1979 | Keyes | 310/103 |
| 4,215,330 | 7/1980 | Hartman | 335/306 |
| 4,341,502 | 7/1982 | Makino | 414/917 |
| 4,379,598 | 4/1983 | Goldowsky | 310/905 |
| 4,381,466 | 4/1983 | Laenens | 310/103 |
| 4,424,473 | 1/1984 | Gorman | 318/568 |

(List continued on next page.)

FOREIGN PATENT DOCUMENTS

| | | |
|---|---|---|
| 0066014 | 6/1981 | European Pat. Off. . |
| 0160305 | 1/1985 | European Pat. Off. . |
| 0272141 | 12/1987 | European Pat. Off. . |
| 0423608 | 10/1990 | European Pat. Off. . |
| 90119433 | 1/1991 | European Pat. Off. . |
| 2633863 | 7/1988 | France . |
| 9200071 | 6/1992 | Germany . |
| 296235 | 10/1987 | Japan . |
| 8809246 | 5/1998 | WIPO . |

OTHER PUBLICATIONS

Joint Development Agreement between Applied Materials and two unrelated companies, dtd. May 29, 1991, pp. 1–14.
*Particulate–Free Vacuum Handler and Transfer System;* IBM Technical Disclosure Bulletin, vol. 32, No. 3A, Aug. 1989, pp. 443–445.
Brochure entitled *Recoma Standard Couplings;* date prior to Jan. 28, 1993 (2 pages).

*Primary Examiner*—Clayton E. Laballe
*Attorney, Agent, or Firm*—Blakely, Sokoloff, Taylor & Zafman

[57] ABSTRACT

A compact assembly of two magnetic couplers for coupling two coaxial angular shaft movements through a vacuum barrier. Each coupler includes two concentric rings of radially oriented magnets, arranged to provide magnetic coupling in a radial direction between corresponding magnets in the rings. A relatively large number of magnets in each ring ensures stiff coupling between rings, but unwanted circumferential coupling between adjacent magnets in each ring is minimized by the presence of a flux ring associated with each ring of magnets. The flux rings provide a return path for radial magnetic flux lines between the rings. Cross-coupling between the couplers is minimized by the presence of a magnetic shield on each ring of magnets. The shields permit the couplers to be located in close proximity on their common axis of rotation. For corrosion resistance, each ring of magnets on the vacuum side of the barrier is housed in a stainless steel enclosure.

21 Claims, 4 Drawing Sheets

U.S. PATENT DOCUMENTS

| | | | |
|---|---|---|---|
| 4,443,043 | 4/1984 | Yamaguchi | 310/90 |
| 4,450,570 | 5/1984 | Weingartner et al. | 373/69 |
| 4,544,317 | 10/1985 | Carter | 414/217 |
| 4,634,889 | 1/1987 | Foggia et al. | 901/16 |
| 4,648,784 | 3/1987 | Wiedemann et al. | 901/29 |
| 4,648,785 | 3/1987 | Nakagawa et al. | 901/15 |
| 4,651,591 | 3/1987 | Wurst | 901/28 |
| 4,664,578 | 5/1987 | Kakehi | 414/217 |
| 4,666,366 | 5/1987 | Davis | 901/25 |
| 4,712,971 | 12/1987 | Fyler | 901/15 |
| 4,715,764 | 12/1987 | Hutchinson | 414/217 |
| 4,730,976 | 3/1988 | Davis et al. | 414/749 |
| 4,767,378 | 8/1988 | Obermann | 464/29 |
| 4,786,359 | 11/1988 | Stark et al. | 204/192.37 |
| 4,808,869 | 2/1989 | Kopp | 310/103 |
| 4,819,167 | 4/1989 | Cheng et al. | 901/6 |
| 4,836,826 | 6/1989 | Carter | 464/29 |
| 4,841,908 | 6/1989 | Jacobson et al. | 118/718 |
| 4,861,563 | 8/1989 | Shekerjian et al. | 414/222 |
| 4,867,629 | 9/1989 | Iwasawa et al. | 414/331 |
| 4,896,064 | 1/1990 | Taiani | 310/104 |
| 4,900,997 | 2/1990 | Durand et al. | 901/15 |
| 4,909,701 | 3/1990 | Hardegen et al. | 901/25 |
| 4,920,551 | 4/1990 | Takahashi et al. | 378/125 |
| 4,923,584 | 5/1990 | Bramhall, Jr. et al. | 414/217 |
| 4,944,860 | 7/1990 | Bramhall, Jr. et al. | 204/298.23 |
| 4,951,601 | 8/1990 | Maydan et al. | 414/217 |
| 4,952,299 | 8/1990 | Chrisos et al. | 414/225 |
| 4,962,441 | 10/1990 | Collins | 118/500 |
| 4,962,726 | 10/1990 | Matsushita et al. | 414/217 |
| 4,975,586 | 12/1990 | Ray | 250/440.1 |
| 5,000,652 | 3/1991 | Christensen et al. | 901/36 |
| 5,013,949 | 5/1991 | Mabe, Jr. | 310/103 |
| 5,019,233 | 5/1991 | Blake et al. | 414/222 |
| 5,046,909 | 9/1991 | Murdoch | 414/225 |
| 5,058,526 | 10/1991 | Matsushita et al. | 414/217 |
| 5,083,896 | 1/1992 | Uehara et al. | 901/21 |
| 5,092,728 | 3/1992 | Crabb et al. | 414/217 |
| 5,134,640 | 7/1992 | Hirokawa et al. | 378/34 |
| 5,147,175 | 9/1992 | Tada | 901/25 |
| 5,151,008 | 9/1992 | Ishida et al. | 901/15 |
| 5,180,276 | 1/1993 | Hendrickson | 901/15 |
| 5,180,955 | 1/1993 | Karidis et al. | 901/29 |
| 5,204,572 | 4/1993 | Ferreira | 310/75 D |
| 5,204,573 | 4/1993 | Bederson et al. | 310/198 |
| 5,227,708 | 7/1993 | Lowrance | 901/20 |
| 5,270,600 | 12/1993 | Hashimoto | 310/75 D |
| 5,291,112 | 3/1994 | Karidis et al. | 318/568.1 |
| 5,293,107 | 3/1994 | Akeel | 901/25 |
| 5,294,209 | 3/1994 | Naka et al. | 901/30 |
| 5,297,910 | 3/1994 | Yoshioka et al. | 414/225 |
| 5,355,066 | 10/1994 | Lowrance | 901/20 |

DUAL COAXIAL MAGNETIC COUPLERS FOR VACUUM CHAMBER ROBOT ASSEMBLY

This is a continuation of application Ser. No. 08/338,426, filed Nov. 14, 1994 now abandoned, which is a continuation of application Ser. No. 08/010,377, filed Jan. 28, 1993 now U.S. Pat. No. 5,376,862.

BACKGROUND OF THE INVENTION

This invention relates generally to electromechanical robots for use in vacuum chamber or other non-atmospheric environments and, more particularly, to vacuum chamber robots using magnetic couplers for transmitting mechanical torque through a vacuum chamber wall without the need for vacuum seals. Robots of various types are often used to move workpieces within a vacuum environment. For example, in semiconductor fabrication, substrates or wafers may need to be moved in and out of processing chambers in a vacuum or near-vacuum environment.

There are two related problems in the design of vacuum chamber robots capable of angular and radial motion. In a typical processing system, the vacuum chamber is centrally located with respect to surrounding processing chambers, and the robot functions to move substrates or other workpieces from one processing chamber to another. One problem with this arrangement is that the vacuum chamber may have to be relatively large to accommodate a large substrate as it is withdrawn from a processing chamber, rotated to a new position, and inserted into another processing chamber. A design goal is to minimize the size of the vacuum chamber, since this results in a lower manufacturing cost, a processing system of smaller volume, and a reduced likelihood of contamination. Reduction of the size of the vacuum chamber may be difficult to achieve if there are many surrounding processing chambers that contribute to the size of the system, but volume reduction is usually an important goal when the number of processing chambers is relatively small.

One way to minimize the vacuum chamber volume is to provide a robot capable of positioning a substrate over the robot's center of rotation. Then the robot and substrate can be rotated in a chamber of the smallest possible size. Providing a robot that can be moved to an over-center position requires a robot drive mechanism that is coupled into the chamber from beneath the chamber. The present invention is concerned with magnetic couplers for transmitting the angular movement of coaxial shafts into the vacuum chamber.

Drive motors for a vacuum chamber robot are preferably mounted outside the chamber, and angular movement must be transmitted through the vacuum chamber wall. Designing the chamber wall to accommodate one or more rotatable shafts that pass through it is an unsatisfactory approach because seals around the drive shafts eventually fail. In the case of a robot providing movement in two dimensions, two independent drive motors are required, further complicating the problem. In some robots, such as the one described in U.S. Pat. No. 4,951,601 to Maydan et al., it is desirable to transmit the two drive torques into the vacuum chamber coaxially. As discussed above, a coaxial drive mechanism is also needed if it desired to move the robot to a compact, over-center position.

Magnetic torque couplers have been used for many purposes in the past. Basically, a magnetic torque coupler consists of two sets of magnets, usually permanent magnets, mounted on separate, but often coaxial, shafts and separated by a vacuum barrier. The sets of magnets are coupled together magnetically, such that rotation of one of the shafts causes synchronous rotation of the other.

Although this concept is a simple one, there are significant difficulties in implementing it in a practical context, especially when providing coupling for two coaxial drives. A fundamental requirement is that the mechanical coupling has to be strong or "stiff." Rotation of one set of magnets has to result in practically synchronous rotation of the other, with minimal lag in response. Loose magnetic coupling results in robot positioning inaccuracies or, at best, in significant positioning delays. If two couplers are used to couple two drive shafts into the vacuum chamber, the couplers must typically be spatially separated to minimize unwanted cross-coupling between them.

Accordingly, there is still need for improvement in the field of vacuum chamber robots. The present invention addresses this need.

SUMMARY OF THE INVENTION

The present invention resides in a dual-axis coaxial magnetic coupler mechanism for use with a vacuum chamber robot. Briefly, and in general terms, the mechanism of the invention comprises first and second couplers, each having a primary ring of magnets and a secondary ring of magnets, concentric with and generally coplanar with the primary ring, each ring being mounted for independent rotation about a common axis, and each ring containing a plurality of radially oriented magnets. The magnets in the primary ring are magnetically coupled, in a radial sense, with corresponding magnets in the secondary ring of the same coupler.

The mechanism further includes means for minimizing unwanted circumferential coupling between adjacent magnets in any of the rings; and means for minimizing cross-coupling between adjacent magnets in different primary or secondary rings. The mechanism provides strong magnetic coupling for the first and second coaxial couplers, with minimal unwanted circumferential coupling or cross-coupling.

In the preferred form of the coupler mechanism, the magnets in each primary and secondary ring have alternating magnetic polarities from one magnet position to the next, and the primary and secondary rings of magnets are located on opposite sides of a vacuum barrier. The means for minimizing unwanted circumferential coupling between adjacent magnets in the same ring includes an annular flux path ring located adjacent to the magnets in each primary and secondary ring, in close proximity to ends of the magnets furthest from the vacuum barrier. The annular flux path rings provide a low-reluctance flux path for radial magnetic coupling across the vacuum barrier, and minimize unwanted circumferential coupling at the ends of the magnets closest to the vacuum barrier.

The means for minimizing cross-coupling between the first and second couplers includes an annular magnetic shield in each of the primary and secondary rings of magnets. The magnetic shield is installed in close proximity to the magnets in the ring, and in a position closest to the other of the couplers. Each magnetic shield provides a flux path for magnetic flux lines that would, in the absence of the annular magnetic shield, result in unwanted cross-coupling between the two couplers.

In the preferred embodiment of the invention, the rings located on the vacuum side of the barrier include a protective covering, of a material such as stainless steel, to minimize the effect of corrosive substances that contaminate the vacuum.

It will be appreciated from the foregoing that the present invention represents a significant advance in the field of magnetic couplers for vacuum chamber robots. In particular, the coupling mechanism of the invention provides strong magnetic coupling of the angular positions of two coaxial shafts, with minimal unwanted circumferential coupling or cross-coupling. Other aspects and advantages of the invention will become apparent from the following more detailed description, taken together with the accompanying drawings.

DESCRIPTION OF THE PREFERRED EMBODIMENT

Figure 1:
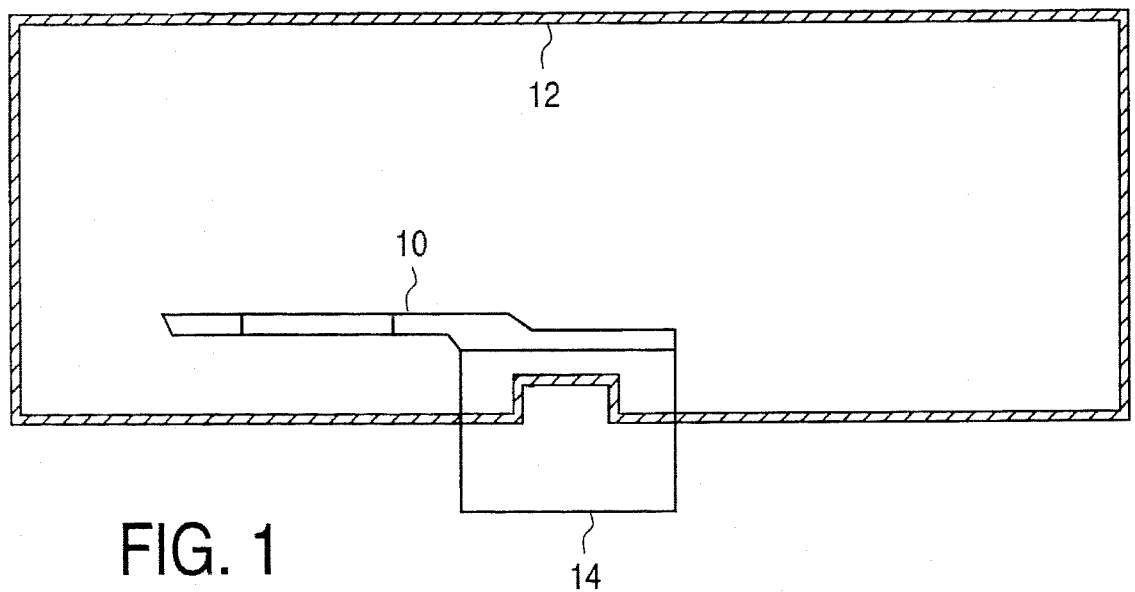
FIG. 1 is a simplified elevational view showing a robot and drive mechanism in relation to a vacuum chamber.

As shown in the drawings for purposes of illustration, the present invention is concerned with vacuum chamber robots, and with dual coaxial magnetic couplers for transmitting two angular shaft displacements through a vacuum chamber wall to a robot assembly. Magnetic couplers avoid the use of friction seals, ferrofluidic seals or bellow structures, and provide the least susceptibility to particulate contamination in the chamber. However, dual coaxial magnetic couplers pose design difficulties, principally because of the need to provide stiff magnetic coupling but still avoid unwanted coupling or "crosstalk" between the two couplers. Crosstalk can be reduced by using weaker magnets, or fewer of them, but this provides for softer coupling and is therefore undesirable. Crosstalk can also be reduced by spacing the two couplers further apart, but this results in an unacceptably large coupler assembly.

In accordance with the present invention, dual coaxial magnetic couplers are provided in a compact assembly, with stiff magnetic coupling, but minimal crosstalk between the couplings. In the illustrative embodiment of the invention, the dual couplers are used to drive a frog-leg robot linkage robot with the ability to move angularly about an axis of rotation and to move radially inward to position a workpiece substantially over the axis of rotation.

By way of background, FIG. 1 shows a robot mechanism, indicated by reference numeral 10, in a vacuum chamber 12. Typically, the robot is used to move workpieces, such as semiconductor or glass substrates, from one processing chamber to another, or between processing chambers and air locks for loading and unloading substrates. The processing chambers and air locks are not shown in FIG. 1, but may adjoin the vacuum chamber in any convenient geometric arrangement. As shown in the figure, a robot drive mechanism 14 is located beneath and totally outside the vacuum chamber 12, to minimize contamination of the chamber and to simplify maintenance of the drive mechanism.

Figure 2:
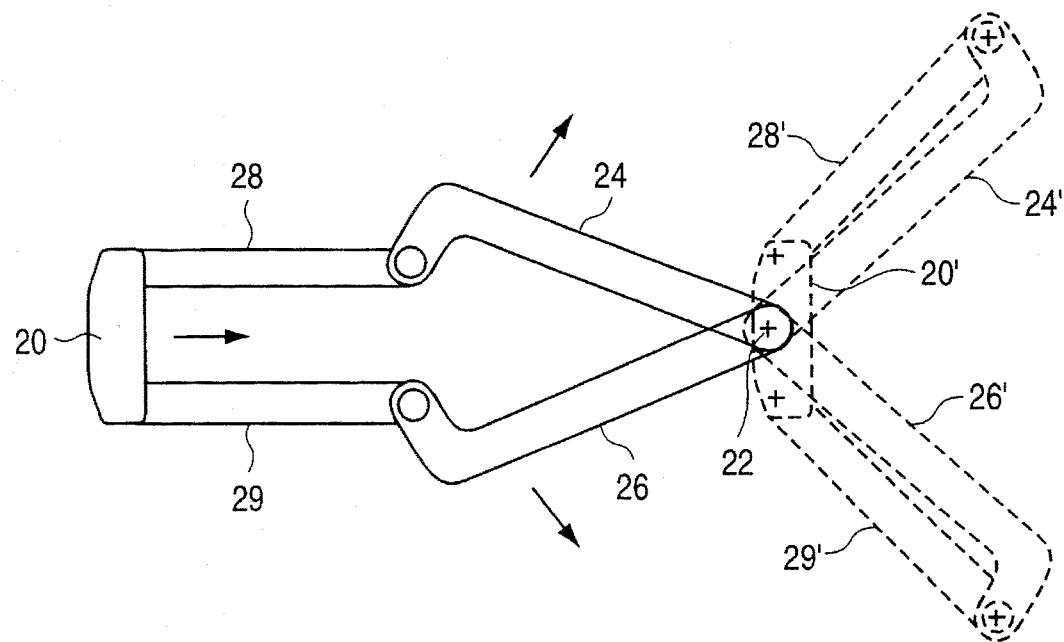
FIG. 2 is a plan view of a frog-leg robot mechanism used in conjunction with the present invention.

FIG. 2 shows the principles of a frogleg robot mechanism, disclosed by way of example as a typical application of the present invention. The frogleg mechanism comprises a mounting plate 20, to which is connected a workpiece support (not shown), sometimes referred to as an end effector. The end effector mount 20 can be moved radially and angularly with respect to an axis of rotation 22. In addition to the end effector mount 20 the mechanism includes four basic components: first and second proximal arms 24 and 26, both pivotally mounted for rotation about the axis 22, and first and second distal arms 28 and 30. The first distal arm 28 is pivotally connected by one end to the free end of the first proximal arm 24, and is pivotally connected by its other end to one side of the end effector mount 20. The second distal arm 30 is similarly connected to the free end of the second proximal arm 26 and to the other side of the end effector mount 20.

When the proximal arms 24 and 26 are rotated in opposite directions, as indicated by the arrows, and at the same angular velocity, the end effector mount 20 is moved toward the axis 22 along a radial path. When both proximal arms 24 and 26 are rotated in the same direction at the same angular velocity, the end effector mount 20 is also rotated about the axis 22, maintaining its radial distance from the axis. The normal sequence of operations of the robot mechanism includes fully extending the end effector mount 20 radially, to pick up a substrate or other part from a processing chamber, and then retracting the end effector mount, rotating it to a new processing chamber position, and extending it again to place the substrate in the new chamber. To minimize the vacuum chamber volume, it is often desirable to be able to retract the end effector mount 20 to a position substantially over the axis of rotation 22. The mechanism is shown in dashed lines in this fully retracted position, with the components being referred to by primed reference numerals.

To attain the fully retracted position illustrated requires that the end effector mount 20 be free to pass over the axis of rotation 22. This in turn requires that the drive mechanism 14 (FIG. 1) used to rotate the proximal arms 24 and 26, be located entirely below the vacuum chamber 12. The fully retracted position cannot be attained if one proximal arm is driven from below and the other from above the vacuum chamber 12.

Figure 3:
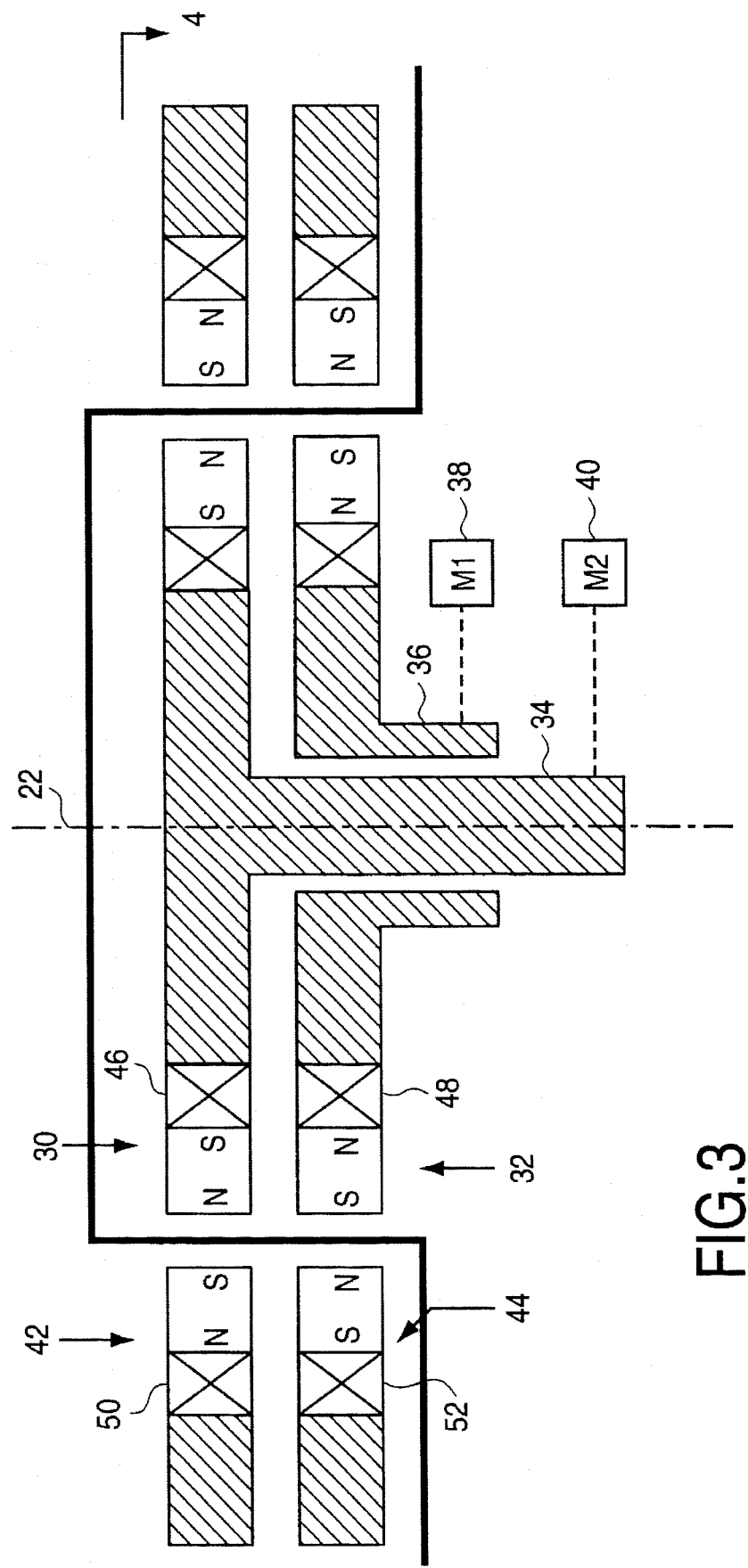
FIG. 3 is a simplified elevational view, partly in section, of two coaxial magnetic couplers in accordance with the invention.

As shown in FIGS. 3–6, the present invention provides a compact arrangement of two coaxial magnetic couplers for driving the robot mechanism. Strong magnetic coupling is achieved without unwanted cross-coupling and without substantial coupling between adjacent magnets on the same side of coupler. As FIG. 3 shows, the dual coupler mechanism consists of first and second primary rings 30 and 32 of magnets, located outside the vacuum chamber wall 12 and mounted for rotation about the common axis 22. For example, the first primary ring 30 may be mounted on a flanged shaft 34 and the second primary ring 32 may be mounted on a flanged bushing 36 that is rotatably mounted on the shaft. Separate drive motors M1 (38) and M2 (40) are coupled to the shaft 34 and the bushing 36, as indicated only diagrammatically in the figure. For example, the motor M1 may be coupled to the bushing 36 by a drive belt, and the motor M2 may be directly coupled to the shaft 34. The motors M1 and M2 are servo motors of conventional design, permitting accurate control of angular position and angular velocity.

Figure 4:
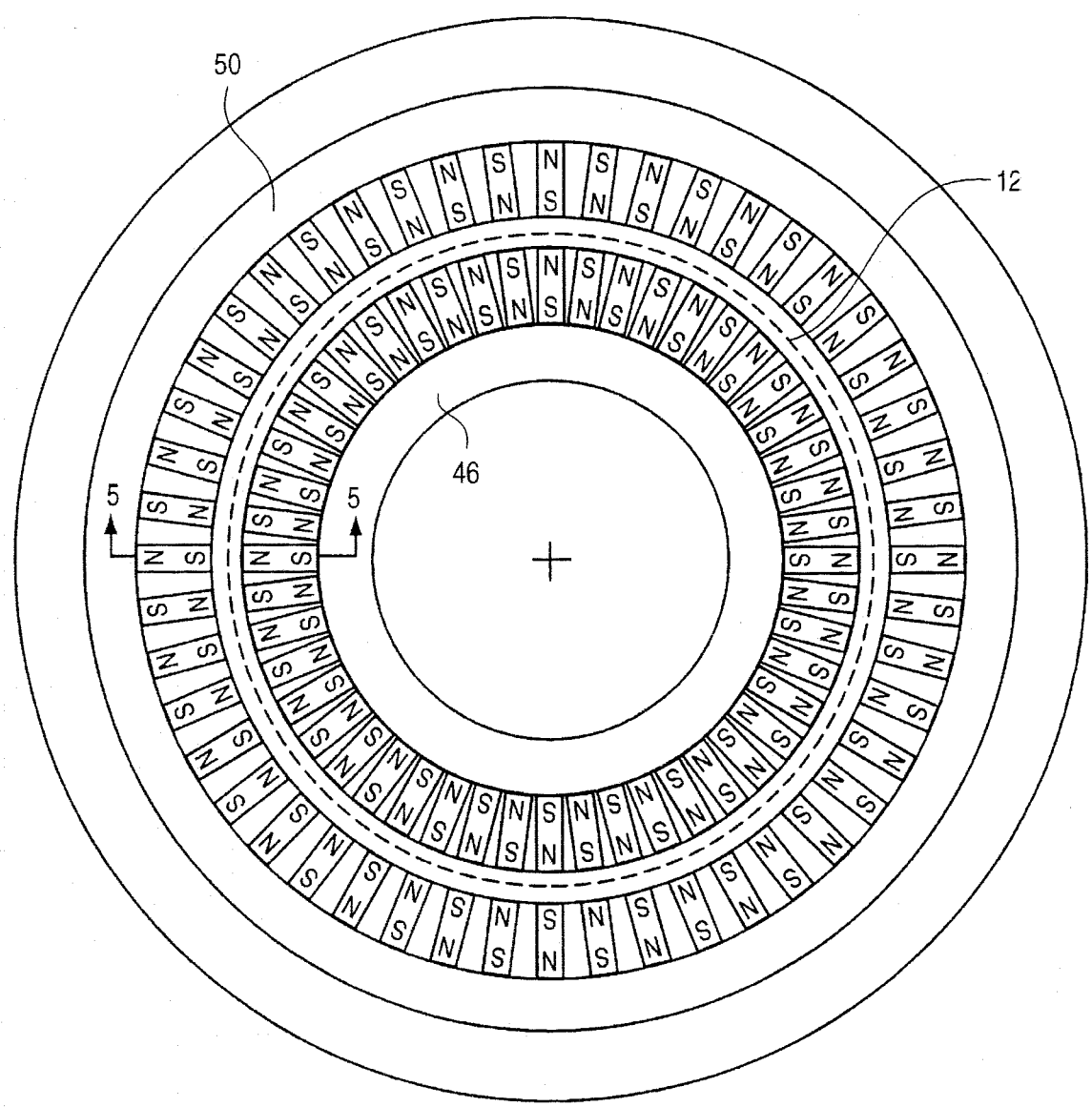
FIG. 4 is a simplified plan view of one of the couplers, taken substantially along the line 4—4 in FIG. 3.

As best shown in FIG. 4, each primary magnet ring 30 or 32 includes a relatively large number of permanent magnets, each indicated in the drawings by their north and south magnetic poles, N and S. In the illustrative embodiment of the invention, there are forty-eight magnets in each ring, The number used in a specific design will depend on such factors as the coupler dimensions and the desired strength of magnetic coupling. For reasons that will become clear as the description proceeds, the magnets are oriented radially in the primary rings 30 and 32, and in the secondary rings to be described.

The dual couplers further include two secondary rings 42 and 44, mounted for rotation about the common axis 22, but located entirely within the chamber wall 12. The secondary rings preferably have the same numbers of magnets as the primary rings. The coupling mechanism works as a result of radial coupling between magnets in the primary rings 30 and 32 and corresponding magnets in the respective secondary rings 42 and 44. Opposite magnetic poles in the primary and secondary rings are mutually attracted through the vacuum chamber wall 12, and angular movement of one of the primary rings 30 and 32 is coupled to the corresponding one of the secondary rings 42 and 44. The secondary rings 42 and 44 are rigidly connected (by means not shown) to the robot mechanism 10 (FIG. 1). In the case of frogleg robot mechanism like that shown in FIG. 2, the secondary rings 42 and 44 are connected to the proximal arms 24 and 26, respectively.

In some prior coupler designs, the permanent magnets were aligned with their poles along a circumferential line. This had two shortcomings. First, not as many magnets could be accommodated by a ring of given size, and second, closely packing magnets into the ring would result in strong circumferential magnetic flux paths around the ring, at the expense of the desired radial flux paths between the primary and secondary rings.

The present invention has the magnets aligned radially, to accommodate a larger number of magnets in a given ring size, and therefore to provide stronger magnetic coupling between the primary and secondary rings. Unwanted coupling between adjacent magnets in the same ring is minimized by providing an annular flux path in each ring. Specifically, the primary rings 30 and 32 have annular flux rings 46 and 48, respectively, positioned inward of the magnets in the primary rings. Similarly, the secondary rings 42 and 44 have annular flux rings 50 and 52 positioned outside the magnets in the secondary rings. The flux rings 46, 48, 50 and 52 provide return paths of low magnetic reluctance for magnetic flux lines passing radially between aligned pairs of primary and secondary magnets. As shown in the enlarged view of FIG. 6, the annular flux rings strengthen the flux paths between primary and secondary magnets. Circumferential coupling at the ends of the magnets furthest from the vacuum chamber interface is desirable (i.e. near the inner poles of the primary rings 30 and 32 and the outer poles of the secondary magnets 42 and 44). Circumferential flux paths in these regions complete multiple parallel magnetic circuits through the radially aligned magnets and strengthen the radial coupling across the vacuum barrier. There will still be some degree of circumferential coupling at the magnet poles near the vacuum chamber wall, but this unwanted coupling is kept proportionally small by the presence of the flux rings. Without the flux rings, there would be no low-reluctance flux return path for radial flux lines, and a weaker magnetic coupling across the vacuum chamber wall 12 would result.

Figure 5:
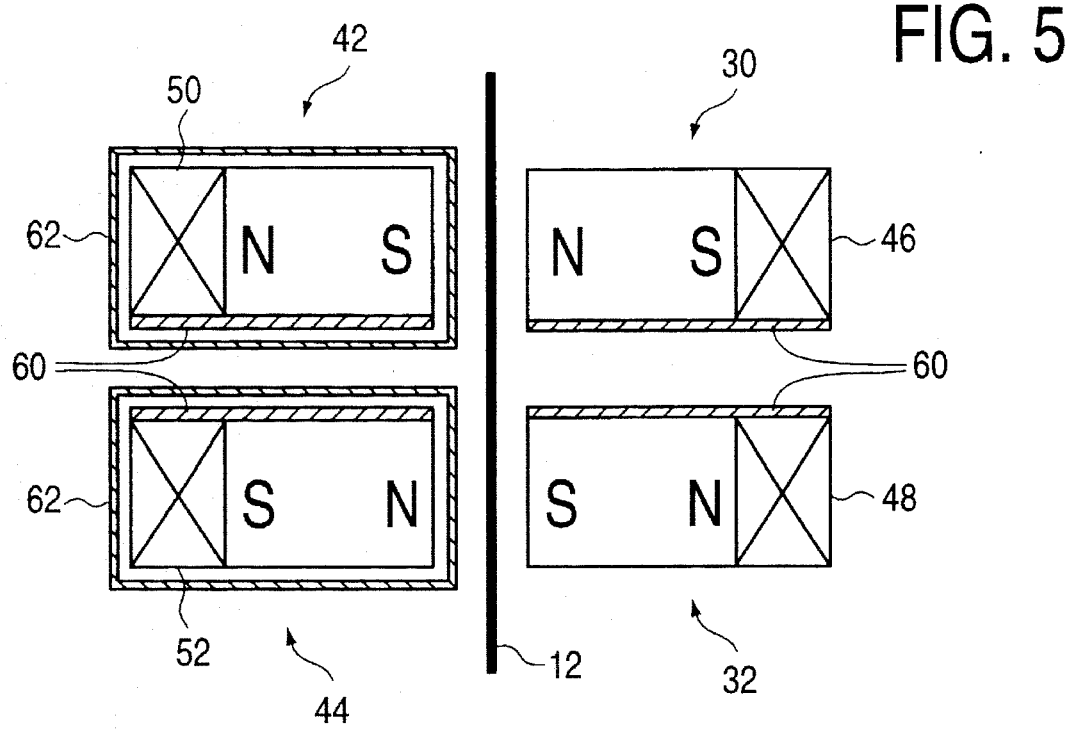
FIG. 5 is an enlarged cross-sectional view of the magnetic couplers, taken substantially along the line 5—5 in FIG. 4.
Figure 6:
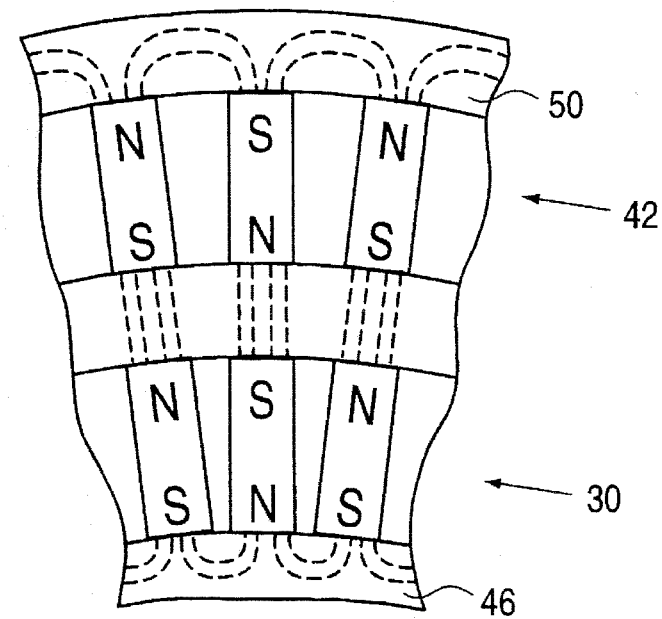
FIG. 6 is a fragmentary enlarged view similar to FIG. 4, showing exemplary magnetic flux paths through one of the couplers.

FIG. 5 illustrates two additional features of the invention not shown in FIGS. 3, 4 and 6. A compact arrangement of the dual couplers is most desirable for a number of reasons, but principally to minimize the height of the vacuum chamber 12 as much as possible. Therefore, the primary magnet rings 30 and 32 and the secondary magnetic rings 42 and 44 must be placed in close proximity. As will be apparent from FIGS. 3 an 5, this proximity can result in unwanted cross coupling between adjacent rings of primary and secondary magnets. In bad cases of cross-coupling, movement of one primary ring 30 or 32, may induce movement of the other. Clearly, such cross-coupling can pose serious problems in operating the dual couplers. In accordance with one aspect of the invention, each or the primary rings 30 and 32 and each of the secondary rings 42 and 44, includes an annular shield ring 60 in contact with the magnets in the primary and secondary rings. The annular shield rings 60 on each primary ring is positioned in contact with the magnet faces nearest the other primary ring. Similarly, the annular shield rings 60 on each secondary ring is positioned in contact with magnet faces nearest the other secondary ring. Each annular shield ring 60 provides flux path that effectively prevents coupling from one primary ring to the other or from one secondary ring to the other. The size and material of the annular shield rings 60 must be selected to provide a magnetic reluctance substantially less than that of the air or vacuum path between adjacent magnet rings, but not so low that the shield ring completely "shorts" the magnets and precludes the desirable flux paths across the vacuum barrier.

Another feature of the invention shown in FIG. 5 is the use of a protective layer 62 surrounding each secondary magnet ring 42 and 44. Although the secondary rings are exposed to a near vacuum environment, the vacuum chamber can become contaminated with materials used in processing chambers surrounding the vacuum chamber. Many of these contaminants are corrosive to ferromagnetic materials used in the magnet rings. The protective layer 62 may be of stainless steel or similar material.

It will be appreciated from the foregoing that the present invention represents a significant advance in the field of magnetic couplers, especially couplers used to transmit mechanical shaft rotation through a vacuum barrier. In particular, the invention provides dual coaxial magnetic couplers of desirably high magnetic strength or stiffness, but without unwanted circumferential coupling between adjacent magnets, and without unwanted cross-coupling. It will also be appreciated that, although a specific embodiment of the invention has been described for purposes of illustration, various modification may be made without departing from the spirit or scope of the invention. Accordingly, the invention should not be limited except as by the appended claims.

I claim:

1. A mechanism for driving a first member and a second member, said mechanism comprising:

a first magnetic coupler coupled to a first motor and the first member for rotating the first member in response to activation of the first motor;

a second magnetic coupler coupled to a second motor and the second member for rotating the second member in response to activation of the second motor;

a shield positioned between the first magnetic coupler and the second magnetic coupler to reduce magnetic coupling between the first magnetic coupler and second magnetic coupler.

2. The drive mechanism defined in claim 1 further comprising a mechanism coupled to the first magnetic coupler to return flux lines passing between aligned pairs of primary magnets and secondary magnets.

3. The drive mechanism defined in claim 2 wherein the mechanism comprises an annular flux ring.

4. The drive mechanism defined in claim 1 wherein the shield comprises a flux path.

5. The drive mechanism defined in claim 1 wherein the shield comprises:

a first annular shield coupled to the first magnetic coupler between the first magnetic coupler and the second magnetic coupler; and a second annular shield coupled to the second magnetic coupler between the first magnetic coupler and the second magnetic coupler.

6. A mechanism for driving a first member and a second member, said mechanism comprising:

a first magnetic coupler coupled to a first motor and the first member for rotating the first member in response to activation of the first motor, wherein the first magnetic coupler comprises a first primary ring of magnets and a first secondary ring of magnets, each ring containing a plurality of radially oriented magnets, wherein magnets in the first primary ring are magnetically coupled in a radial direction to corresponding magnets in the first secondary ring;

a second magnetic coupler coupled to a second motor and the second member for rotating the second member in response to activation of the second motor, wherein the second magnetic coupler comprises a second primary ring of magnets and a second secondary ring of magnets, each ring containing a plurality of radially oriented magnets, wherein magnets in the second primary ring are magnetically coupled in a radial direction to corresponding magnets in the second secondary ring;

a shield coupled to the first magnetic coupler and the second magnetic coupler to prevent magnetic coupling between magnets in rings of the first magnetic coupler and magnets in rings of the second magnetic coupler;

a first pair of annular rings coupled to magnets in the first magnetic coupler to strengthen magnetic coupling between the first primary ring and the first secondary ring of the first magnetic coupler; and a second pair of annular rings coupled to magnets in the second magnetic coupler to strengthen magnetic coupling between the second primary ring and the second secondary ring of the second magnetic coupler.

7. The drive mechanism defined in claim 6 wherein the shield comprises:

a first annular magnetic shield connected to magnets in the first magnetic coupler; and a second annular magnetic shield connected to magnets in the second magnetic coupler.

8. The drive mechanism defined in claim 6 wherein the first pair of annular rings and the second pair of annular rings return flux lines passing between aligned pairs of primary magnets and secondary magnets.

9. The drive mechanism defined in claim 8 wherein the first pair of annular rings and the second pair of annular rings comprise annular flux rings.

10. The drive mechanism defined in claim 6 wherein the shield comprises a pair of flux paths.

11. A mechanism for driving a first member and a second member, said mechanism comprising:

a first magnetic coupler coupled to a first motor and the first member for rotating the first member in response to activation of the first motor;

a second magnetic coupler coupled to a second motor and the second member for rotating the second member in response to activation of the second motor;

a shield positioned between the first magnetic coupler and the second magnetic coupler to provide a magnetic reluctance substantially less than that of an area between adjacent magnet rings of the first magnetic coupler and second magnetic coupler.

12. The mechanism defined in claim 11 wherein the area comprises a vacuum path.

13. The mechanism defined in claim 11 wherein the area comprises an air path.

14. A drive mechanism for rotating a first member, said drive mechanism comprising:

a first motor;

a first magnetic coupler coupled to the first motor for magnetically coupling rotation motion generated in response to activation of the first motor across a wall to rotate the first member, wherein the first magnetic coupler comprises a first primary ring of magnets and a first secondary ring of magnets, wherein magnets in the first primary ring are magnetically coupled in a radial direction to corresponding magnets in the first secondary ring; and a first pair of annular rings coupled to magnets in the first magnetic coupler in close proximity to ends of magnets furthest from the wall to strengthen magnetic coupling between the first primary ring and the first secondary ring of the first magnetic coupler.

15. The drive mechanism defined in claim 14 further comprising:

a second motor;

a second magnetic coupler coupled to the second motor for magnetically coupling rotation motion generated in response to activation of the second motor across a wall to rotate a second member, wherein the second magnetic coupler comprises a second primary ring of magnets and a second secondary ring of magnets, wherein magnets in the second primary ring are magnetically coupled in a radial direction to corresponding magnets in the second secondary ring;

a second pair of annular rings coupled to magnets in the second magnetic coupler in close proximity to ends of magnets furthest from the wall to strengthen magnetic coupling between the second primary ring and the second secondary ring of the second magnetic coupler.

16. The drive mechanism defined in claim 15 further comprising a shield coupled to the first magnetic coupler and the second magnetic coupler to reduce magnetic coupling between magnets in rings of the first magnetic coupler and magnets in rings of the second magnetic coupler.

17. A robot comprising:

a first robotic member and a second robotic member;

a first magnetic coupler that transmits motion generated by a first motor across a wall to drive a first robotic member;

a second magnetic coupler that transmits motion generated by a second motor across a wall to drive a second robotic member;

a shield positioned between the first magnetic coupler and the second magnetic coupler to reduce magnetic coupling between the first magnetic coupler and second magnetic coupler, such that rotations of the first robotic member and the second robotic member are independently controlled.

18. The drive mechanism defined in claim 17 further comprising a mechanism coupled to the first magnetic coupler to return flux lines passing between aligned pairs of primary magnets and secondary magnets.

19. The drive mechanism defined in claim 18 wherein the mechanism comprises an annular flux ring.

20. The drive mechanism defined in claim 17 wherein the shield comprises a flux path.

21. The drive mechanism defined in claim 17 wherein the shield comprises:

a first annular shield coupled to the first magnetic coupler between the first magnetic coupler and the second magnetic coupler; and a second annular shield coupled to the second magnetic coupler between the first magnetic coupler and the second magnetic coupler.

* * * * *